(12) United States Patent
Coers et al.

(10) Patent No.: US 8,132,659 B2
(45) Date of Patent: Mar. 13, 2012

(54) TRACTOR MOUNTED UNLOADING CONVEYOR

(75) Inventors: Bruce A. Coers, Hillsdale, IL (US); Daniel J. Burke, Cordova, IL (US); Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 266 days.

(21) Appl. No.: 12/173,543

(22) Filed: Jul. 15, 2008

(65) Prior Publication Data

US 2010/0012467 A1 Jan. 21, 2010

(51) Int. Cl.
*B65G 15/26* (2006.01)
(52) U.S. Cl. .......................... 198/313; 198/303
(58) Field of Classification Search .................. 198/312, 198/313, 318, 303, 315; 414/523
See application file for complete search history.

(56) References Cited

U.S. PATENT DOCUMENTS

| | | | | |
|---|---|---|---|---|
| 2,782,943 A * | 2/1957 | Jones et al. | ................... | 414/508 |
| 3,051,295 A * | 8/1962 | Moy | ............................ | 198/313 |
| 3,184,045 A * | 5/1965 | Fry | ............................ | 198/316.1 |
| 3,371,768 A * | 3/1968 | Oury et al. | .................... | 198/304 |
| 3,552,546 A * | 1/1971 | Rath | ............................ | 198/306 |
| 3,596,777 A * | 8/1971 | Neely, Jr. | .................. | 414/789.4 |
| 3,598,224 A * | 8/1971 | Oury | ............................ | 198/301 |
| 3,613,866 A * | 10/1971 | Arndt | ............................ | 198/812 |
| 3,638,782 A * | 2/1972 | Cotton et al. | ............... | 198/316.1 |
| 3,687,276 A * | 8/1972 | Pelletier | ........................ | 198/314 |
| 3,850,283 A * | 11/1974 | Nordstrom | .................... | 198/313 |
| 3,885,375 A * | 5/1975 | Solterbeck | .................... | 56/15.6 |
| 4,011,936 A * | 3/1977 | Hall | ............................ | 198/517 |
| 4,199,913 A * | 4/1980 | Hood et al. | .................... | 53/244 |
| 4,270,881 A * | 6/1981 | Baker et al. | .................. | 414/398 |
| 4,281,955 A * | 8/1981 | McWilliams | ................. | 414/398 |
| 4,512,687 A * | 4/1985 | Enns | ............................ | 406/41 |
| 4,526,265 A * | 7/1985 | Enns | ............................ | 198/318 |
| 4,813,526 A * | 3/1989 | Belanger | ........................ | 198/313 |
| 4,919,583 A * | 4/1990 | Speakman, Jr. | ............... | 414/528 |
| 5,197,845 A * | 3/1993 | Snead | ............................ | 414/339 |
| 5,297,665 A * | 3/1994 | Smith | ............................ | 198/313 |
| 5,360,097 A * | 11/1994 | Hibbs | ............................ | 198/313 |
| 5,657,621 A * | 8/1997 | Mendes et al. | ............. | 56/16.4 D |
| 6,283,269 B1 * | 9/2001 | Mayer | ............................ | 198/313 |
| 6,378,686 B1 * | 4/2002 | Mayer et al. | .................. | 198/314 |
| 6,604,620 B2 * | 8/2003 | Dennis | .......................... | 198/312 |
| 6,758,317 B1 * | 7/2004 | Colby | ............................ | 198/312 |
| 7,014,410 B2 * | 3/2006 | Barry | ............................ | 414/337 |
| 7,223,059 B2 * | 5/2007 | Smith et al. | .................. | 414/505 |
| 7,513,354 B1 * | 4/2009 | Canapa | .......................... | 198/312 |
| 8,033,775 B2 * | 10/2011 | Donelson et al. | ............. | 414/502 |

* cited by examiner

*Primary Examiner* — Joseph A Dillon, Jr.
(74) *Attorney, Agent, or Firm* — Taylor IP, P.C.

(57) ABSTRACT

A conveyor is mounted on a tractor and extends from a hopper at the front of the tractor to an outlet behind the tractor. An agricultural harvester unloading system is operated to deposit grain from the harvester into the hopper of the conveyor. The conveyor is operated to transfer the grain into a cart pulled by the tractor.

7 Claims, 4 Drawing Sheets

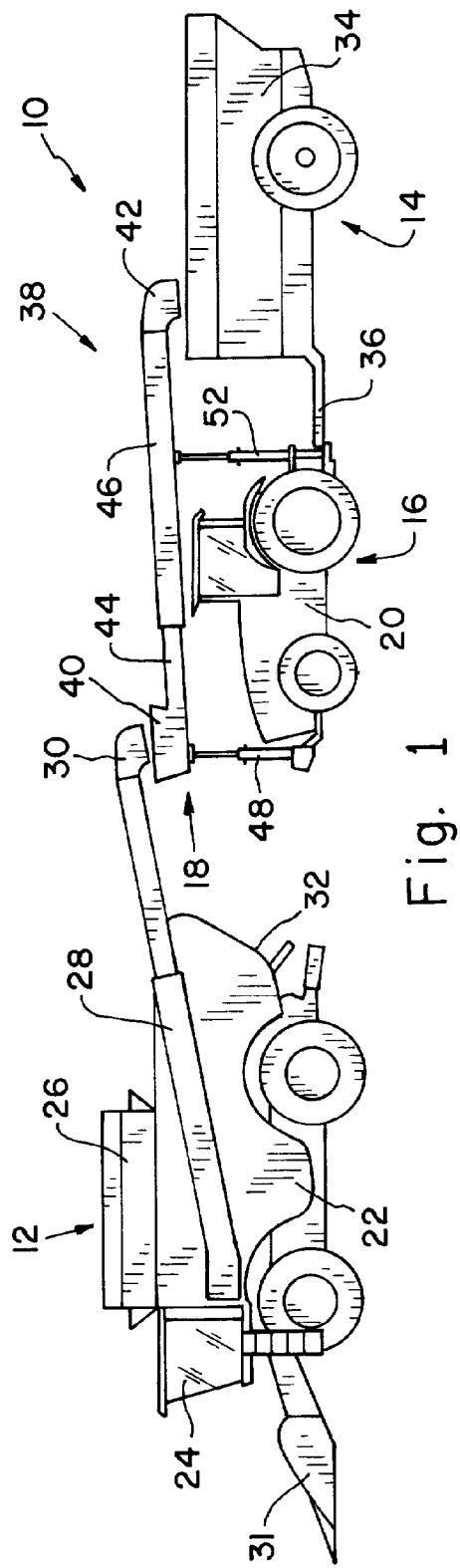
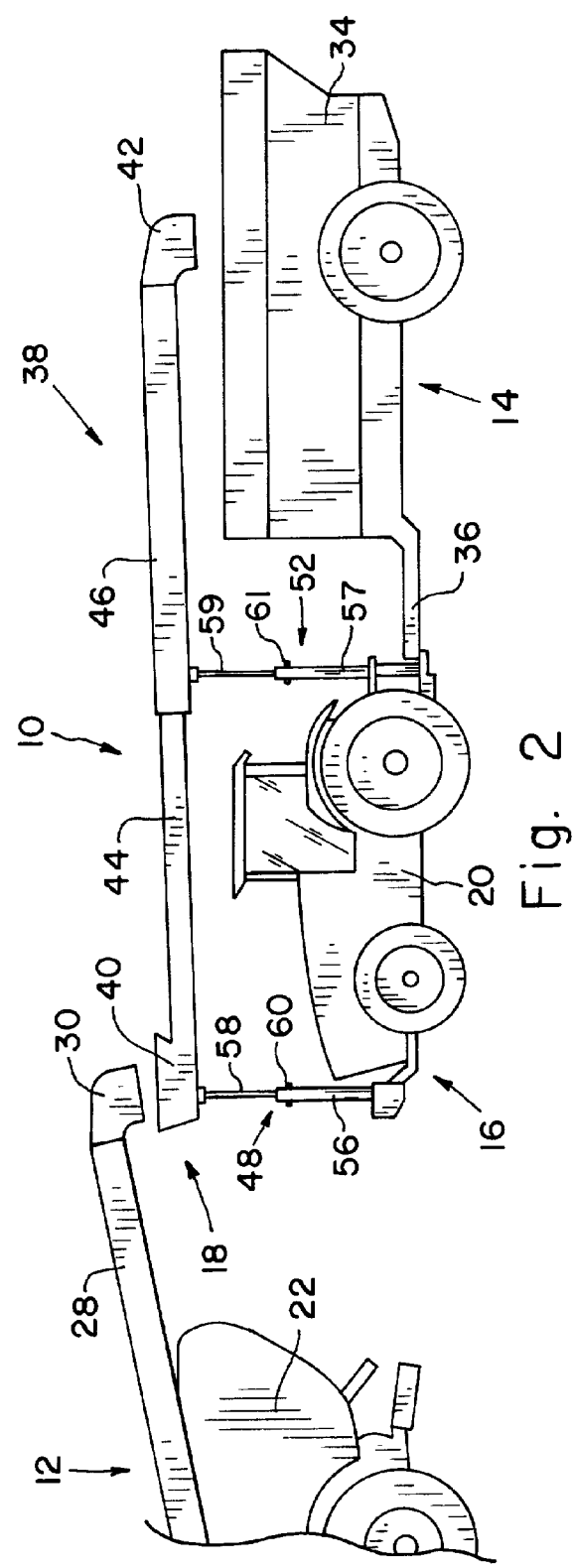
Fig. 1
Fig. 2

TRACTOR MOUNTED UNLOADING CONVEYOR

FIELD OF THE INVENTION

The present invention relates to agricultural harvesters, and, more particularly, to unloading systems for such harvesters.

BACKGROUND OF THE INVENTION

Agricultural harvesters, such as combines, remove a crop material from the field, gather the crop material and transport it to a separator on the harvester. The separator removes the grain crop material from the non-grain crop material. The grain is cleaned and deposited in a grain tank on the harvester. When the grain tank becomes full, the harvester is positioned adjacent a vehicle into which the grain is to be unloaded, such as a semi-trailer, gravity wagon, truck, etc.; and an unloading system on the harvester is actuated to transfer the grain from the grain tank directly into the vehicle. It is known for the unloading system to be fully contained on the harvester, and to include gravity discharge of the grain from the grain tank onto a conveyor for transport to an auger operable to only one side of the harvester so that the receiving vehicle must be positioned on that side of the harvester. The auger on the harvester deposits the grain directly into the receiving vehicle.

A trend in agricultural machines is for the size of the machines to become larger, reducing the number of passes required to cover a field. If the width of a harvester is increased, more grain is harvested during each pass over the field. Accordingly, the grain tank fills quickly. When breaking into a new field, or into a new area of a large field, if the harvester has made only a single pass or less than a complete pass through the field, there is no harvested area alongside the harvester in which to position the vehicle to receive the grain being transferred from the grain tank. So as not to trample non-harvested crop areas, wasting the grain therein, it is known to use the harvester to clear out an area in which to position vehicles for unloading. However, short area operation of a large harvester is difficult and inefficient. This process can be repeated several times across a large field to keep harvester travel times to a minimum on the ends of the field.

Further, when the harvester operates back and forth in adjacent paths from one end of a field to an opposite end of the field, if field is long it may be necessary to unload the grain tank at locations intermediate the ends of the field, with the harvester headed in either direction. Accordingly, it may be necessary to unload when the known unloading auger is on the side adjacent the non-harvested crop area. When this occurs, the harvester must be repositioned so that the receiving vehicle can be positioned in the harvested area. The harvester must be stopped for unloading in a situation such as described.

What is needed in the art is an unloading system that allows inline unloading rearward from the harvester.

SUMMARY OF THE INVENTION

The present invention provides an independent conveyor on a tractor to serve as a bridge between the unloading auger on an agricultural harvester and a vehicle into which the harvester is being unloaded, thereby allowing unloading to occur directly behind the harvester, and not requiring a cleared area alongside the harvester.

The invention in one form is directed to a transfer implement for emptying grain from an agricultural harvester. The transfer implement includes an agricultural tractor and a conveyor attached to the tractor, the conveyor having a length sufficient to extend from an unloading system of the harvester positioned at one end of the tractor to a grain cart being pulled by the tractor.

The invention in another form is directed to an agricultural equipment assembly for receiving grain from an agricultural harvester. The equipment assembly includes a tractor, a grain cart attached to and pulled by the tractor, and a conveyor mounted on the tractor. The conveyor has an inlet hopper near the front of the tractor and an outlet positioned over the cart.

The invention in still another form is directed to a method for unloading an agricultural harvester having an unloading system. The method has steps of driving a tractor near to the harvester, the tractor having a conveyor mounted thereon; pulling a cart with the tractor during the driving step; positioning a hopper of the conveyor so that the hopper receives grain from the harvester unloading system; operating the harvester unloading system to deposit grain from the harvester into the hopper of the conveyor; and operating the conveyor to transfer grain from the hopper into the cart.

BRIEF DESCRIPTION OF THE DRAWINGS

FIG. 1 is a perspective view of an agricultural harvester unloading process utilizing a tractor mounted conveyor, both in accordance with the present invention;

FIG. 2 is a perspective view similar to that of FIG. 1, but illustrating the tractor mounted conveyor in a different position of adjustment;

DETAILED DESCRIPTION OF THE INVENTION

Figure 3:
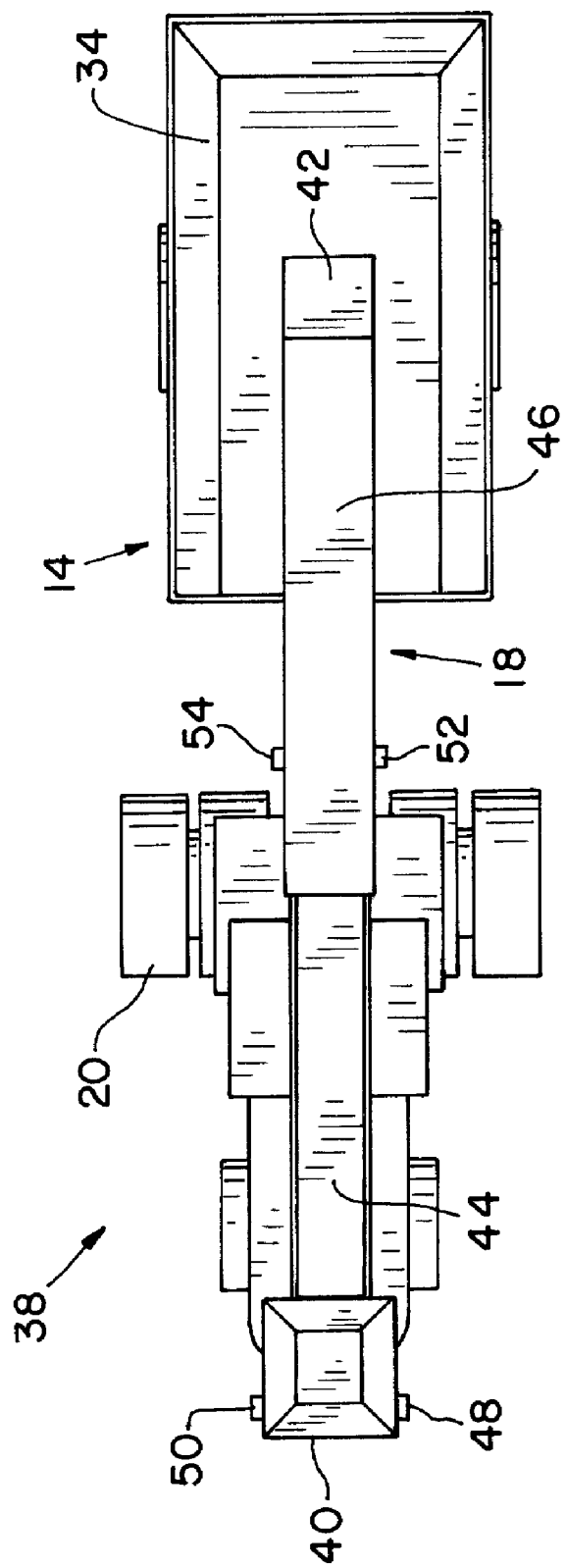
FIG. 3 is a top view of the equipment assembly including the tractor, conveyor and cart shown in FIGS. 1 & 2.

Referring now to the drawings, and more particularly to FIG. 1, there is shown an unloading process 10 by which an agricultural harvester 12 is unloaded into a vehicle such as a tractor drawn grain cart 14. Unloading process 10 utilizes an intermediate transfer implement 16, which includes a transfer conveyor 18 mounted on a tractor 20, with tractor 20 also pulling cart 14.

Harvester 12 generally includes a body 22, an operator cab 24, a grain tank 26 and an unloading auger 28. Unloading auger 28 is a component of an unloading system of harvester 12, which may also include other internal augers and conveyors (not shown) used for transporting grain from grain tank 26. Unloading auger 28 includes a directing elbow 30 at the outlet end. At the front thereof, harvester 10 is detachably coupled with a cutting platform or head 31 for removing crop from a field. The crop material is transported from head 31 into a separator within harvester 12. The desirable grain material is separated from the undesirable crop refuse, with the grain being transported into grain tank 26, and the non-grain or refuse crop material being discharged back onto the field using a chopper 32 at the back of harvester 12.

Cart 14 is a conventional grain hauling cart including an open-top bin 34 and a tongue 36 by which cart 14 can be connected to a vehicle, such as tractor 20, for transportation.

Tractor 20 is a conventional agricultural tractor of suitable size for the application.

Cart 14, conveyor 18 and tractor 20 connected as described form a single agricultural equipment assembly 38 that is operable conveniently within the unloading process.

Conveyor 18 is mounted on tractor 20, and, during the unloading process, spans a distance between the outlet of unloading auger 28 of harvester 12 and the interior volume of bin 34 being pulled behind tractor 20. Accordingly, conveyor 18 passes over tractor 20, and extends from near the front of tractor 20 a sufficient length rearward therefrom, over tongue 36 to a location above bin 34. Conveyor 18 includes a receiving hopper 40 at one end thereof and an outlet 42 at the opposite end thereof.

In an advantageous embodiment thereof, conveyor 18 is extendable and retractable in axial length. Accordingly, conveyor 18 has an inlet conveyor section 44 receiving grain from hopper 40, and an outlet conveyor section 46 which receives grain from inlet conveyor section 44 and transports the grain to outlet 42.

Conveyor 18 has front vertical supports 48 and 50 connected to tractor 20 at the front thereof, and rear vertical supports 52, 54 connected to tractor 20 at the rear thereof. In an advantageous structure of the present invention, supports 48, 50, 52 and 54 are each adjustable in length, including telescopic upper and lower tubes. In FIGS. 1 & 2, vertical supports 48 and 52 are shown with lower tubes 56, 57 respectively, and upper tubes 58, 59, respectively. Pins 60, 61 lock the adjusted positions of the upper and lower tubes. It should be understood that vertical supports 50 and 54 are constructed similarly to that shown for vertical supports 48 and 52. In a preferred arrangement, front supports 48, 50 and rear supports 52, 54 are adjustable independently of the other. Accordingly, as necessary, conveyor 18 can be lifted or lowered relative to tractor 20, and can be tilted upwardly or downwardly from receiving hopper 40 to outlet 42, by adjusting the front and rear supports relative to each other. Conveyor 18 can be oriented substantially horizontal from receiving hopper 40 to outlet 42. Conveyor 18 also can be oriented upwardly from receiving hopper 40 to outlet 42 or downwardly from receiving hopper 40 to outlet 42. The angle upwardly or downwardly can be more or less steep depending on the adjustment of vertical supports 48, 50, 52 and 54. Thus, the position of receiving hopper 40 relative to elbow 30 of unloading auger 28 and the position of outlet 42 relative to bin 34 can be adjusted as desired or necessary for the harvester and grain cart being used, the topography of the land being harvested, the relative positions of the equipment during unloading, and the like.

Figure 4:
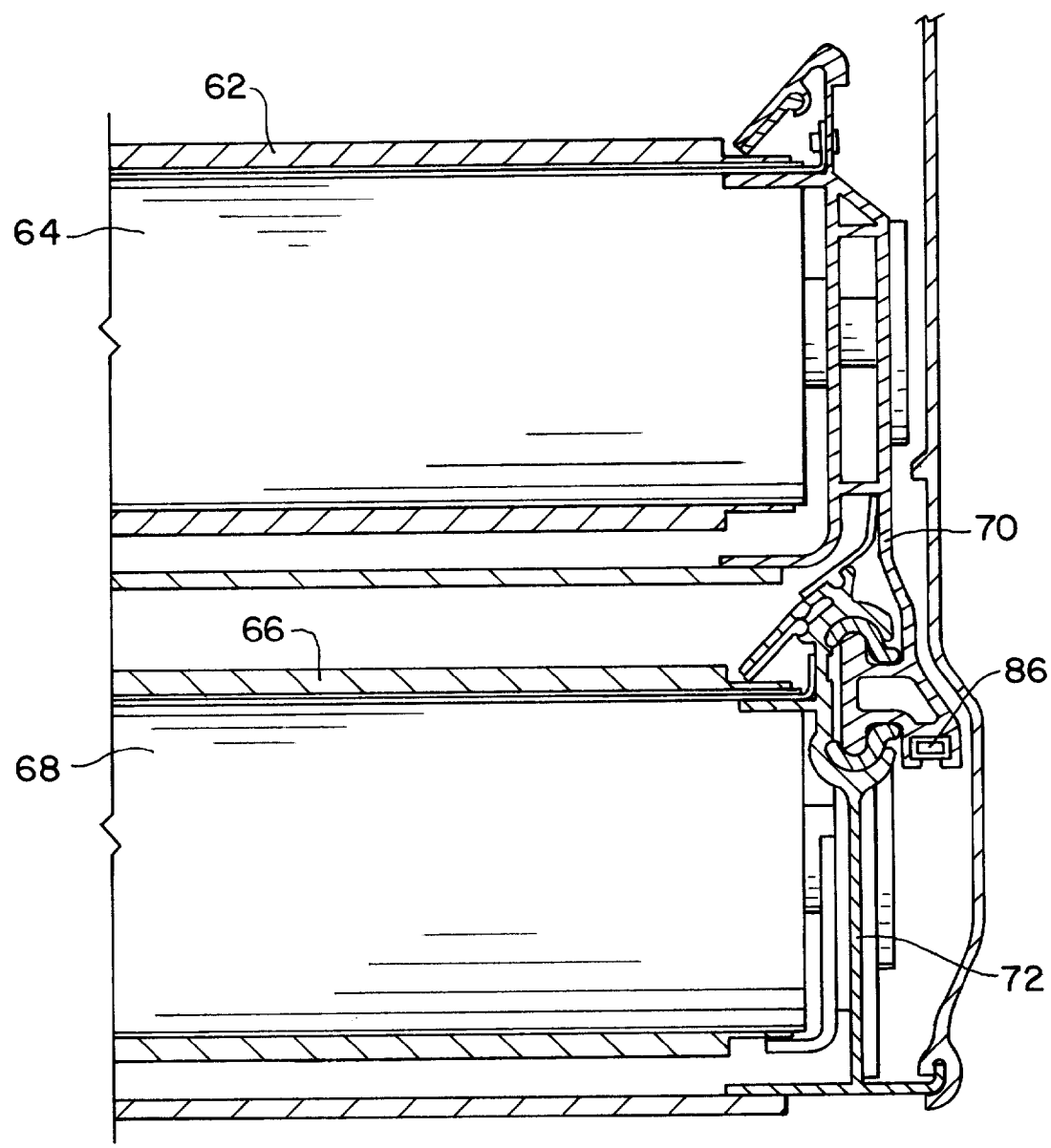
FIG. 4 is a cross-sectional view through the conveyor shown in the previous views.

FIG. 4 shows conveyor 18 in cross-section, and illustrates an upper conveyor belt 62 and drive roll 64 of inlet section 44 and a lower conveyor belt 66 and drive roll 68 of outlet section 46 in conveyor 18. Inlet section 44 and outlet section 46 are interconnected by sliding frames 70, 72 of inlet section 44 and outlet section 46, respectively. Sliding frames 70, 72 allow axial movement of outlet section 46 and lower belt 66 therein relative to inlet section 44 and upper belt 62 thereof. Inlet section 44 is fixed in axial position relative to tractor 20 by the connections of vertical supports 48, 50, 52, 54 to tractor 20; and outlet section 46 is axially movable relative thereto. Accordingly, by extending or retracting outlet section 46 relative to inlet section 44 the position of outlet 42 relative to bin 34 can be adjusted for directing the grain into bin 34 to fill bin 34 evenly. Different angular and axially extended positions of conveyor 18 are shown in FIGS. 1 and 2.

Figure 5:
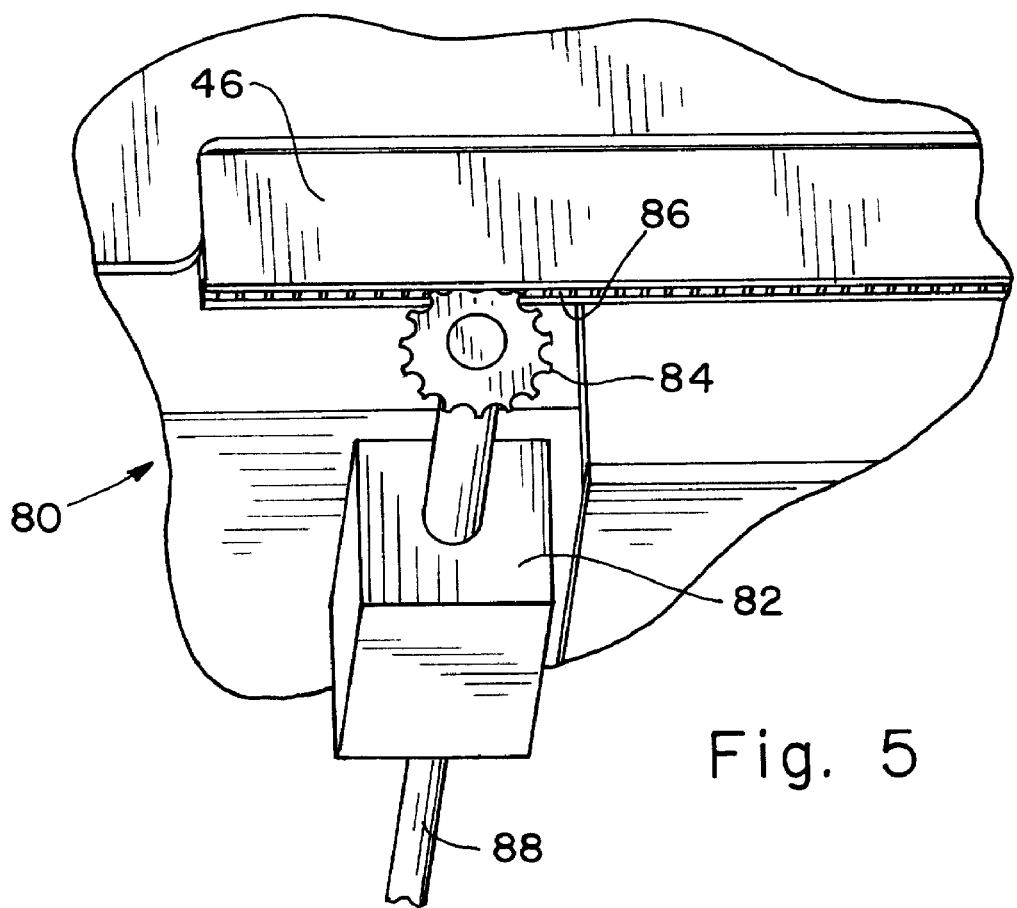
FIG. 5 is a fragmentary perspective view of the conveyor.

Axial adjustment of outlet section 46 relative to inlet section 44 can be accomplished using a drive mechanism 80 shown in FIG. 5, which includes a hydraulic motor 82 rotating a gear 84, with gear 84 being drivingly engaged with a chain or rack gear 86 associated with outlet section 46. Advantageously, a hydraulic line 88 connects hydraulic motor 82 to the onboard hydraulic system of tractor 20. Similar hydraulic drive motors can be used for operating conveyor belts 62, 66 also from the hydraulic system of tractor 20.

During an unloading operation, tractor 20, while pulling cart 14 along with it, is driven close to harvester 12, and can follow closely behind harvester 12 such that hopper 40 is positioned under elbow 30 of unloading auger 28. The unloading system of harvester 12 is operated such that grain from grain tank 26 is transferred to and transported the length of unloading auger 28. The grain is deposited into receiving hopper 40 from the outlet of auger 28 at elbow 30. Upper conveyor belt 62 carries the grain part of the length of conveyor 18 and deposits the grain on lower conveyor belt 66. Lower conveyor belt 66 transports the grain the remaining length of conveyor 18 so that the grain falls through outlet 42 and is deposited in bin 34.

When necessary or desirable, the axial length of conveyor 18 can be changed by extending or retracting outlet section 46 relative to inlet section 44. Outlet 42 can be positioned at various locations along the length of bin 34 to evenly and completely fill the bin from the front thereof to the back thereof. The axial length of conveyor 18, and therefore the position of outlet 42 relative to bin 34 can be adjusted easily and quickly before or during unloading by actuating hydraulic motor 82 in one direction or the other, to rotate drive gear 84 in driving engagement with chain or rack gear 86.

Further, when necessary or desirable, the elevation of conveyor 18 relative to tractor 20 can be changed, and/or the angular orientation of conveyor 18 from receiving hopper 40 to outlet 42 can be changed by adjusting the lengths of vertical supports 48, 50, 52 and 54.

Since the attached structures of tractor 20, cart 14 and conveyor 18 are attached in line as an interconnected equipment assembly 38, the equipment assembly can follow behind harvester 12 during unloading. Accordingly, it is not necessary to clear portions of not yet harvested crop adjacent harvester 12 only for the purposes of positioning equipment for unloading. Automated control linkage between tractor 20 and harvester 12 can be used to control the tractor speed and position with respect to the harvester for unloading.

The tractor mounted conveyor system enables rear unloading, which eliminates the need to stop and cutout an area to unload when opening up or breaking through a field, thereby reducing grain loss and reducing non-value added time. The unloading system provides practical and efficient unloading for tramlines that is independent of header width or tramline spacing.

Having described the preferred embodiment, it will become apparent that various modifications can be made without departing from the scope of the invention as defined in the accompanying claims.

The invention claimed is:

1. A transfer implement for emptying grain from an agricultural harvester, said transfer implement comprising:
    an agricultural tractor;
    a conveyor attached to said tractor, said conveyor having a length sufficient to extend from an unloading system of the harvester positioned at one end of the tractor to a receiving vehicle at an opposite end of said tractor, said conveyor being extendable and retractable in an axial direction above a portion of said receiving vehicle, said agricultural tractor being connected to said receiving vehicle, said agricultural tractor being capable of pulling said receiving vehicle, said conveyor, said agricultural tractor and said receiving vehicle being attached in line as an interconnected assembly; and a driving connection between said tractor and said conveyor for operating said conveyor, the transfer implement being configured to position a portion of said conveyor under the unloading system of the harvester as the transfer implement follows the moving agricultural harvester.

2. The transfer implement of claim 1, said conveyor including vertical attachments at a front and a rear of said tractor.

3. The transfer implement of claim 2, said vertical attachments being adjustable in length.

4. The transfer implement of claim 3, said conveyor including an inlet section and an outlet section that are slidingly interconnected.

5. The transfer implement of claim 1, said conveyor including an inlet section and an outlet section interconnected by sliding frames.

6. The transfer implement of claim 5, including vertical attachments to the tractor at the front and the rear of the tractor, said vertical attachments being independently adjustable for changing a height and an angle of said conveyor relative to said tractor.

7. The transfer implement of claim 1, said driving connection being a hydraulic connection.

\* \* \* \* \*